US008837906B2

(12) United States Patent
May et al.

(10) Patent No.: US 8,837,906 B2
(45) Date of Patent: Sep. 16, 2014

(54) COMPUTER ASSISTED DISPATCH INCIDENT REPORT VIDEO SEARCH AND TAGGING SYSTEMS AND METHODS

(71) Applicants: Philip E. May, Palatine, IL (US); Steven D. Tine, Buffalo Grove, IL (US)

(72) Inventors: Philip E. May, Palatine, IL (US); Steven D. Tine, Buffalo Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 13/714,663

(22) Filed: Dec. 14, 2012

(65) Prior Publication Data

US 2014/0169752 A1 Jun. 19, 2014

(51) Int. Cl.
*H04N 9/80* (2006.01)
*H04N 9/077* (2006.01)
*G06K 9/00* (2006.01)

(52) U.S. Cl.
USPC ........... 386/248; 386/241; 386/239; 348/286; 348/288; 382/103

(58) Field of Classification Search
USPC ................. 386/241, 239, 248; 348/286, 288; 382/103
See application file for complete search history.

(56) References Cited

U.S. PATENT DOCUMENTS

| | | | |
|---|---|---|---|
| 5,850,352 A | 12/1998 | Moezzi | |
| 5,895,473 A | 4/1999 | Williard | |
| 6,154,754 A | 11/2000 | Hsu | |
| 6,408,304 B1 | 6/2002 | Kumhyr | |
| 7,610,546 B1 | 10/2009 | Nagao | |
| 7,724,130 B2 | 5/2010 | Norstrom | |
| 2007/0016575 A1* | 1/2007 | Hurst-Hiller et al. | 707/5 |
| 2009/0077039 A1* | 3/2009 | Narahara | 707/3 |
| 2009/0094520 A1 | 4/2009 | Kulas | |
| 2009/0106362 A1* | 4/2009 | Kuhlke et al. | 709/204 |
| 2009/0248643 A1 | 10/2009 | Wasson | |
| 2009/0276708 A1 | 11/2009 | Smith | |
| 2010/0048242 A1 | 2/2010 | Rhoads | |
| 2011/0018998 A1 | 1/2011 | Guzik | |
| 2012/0041956 A1 | 2/2012 | Smith-Semedo | |
| 2012/0147192 A1 | 6/2012 | Wright et al. | |
| 2012/0233000 A1 | 9/2012 | Fisher et al. | |
| 2012/0256745 A1 | 10/2012 | Piett et al. | |

FOREIGN PATENT DOCUMENTS

| | | |
|---|---|---|
| WO | 2005043286 A3 | 5/2005 |
| WO | 2006107430 A1 | 10/2006 |
| WO | 2007073349 A1 | 6/2007 |
| WO | 2011059659 A1 | 5/2011 |

OTHER PUBLICATIONS

International Search Report and Written Opinion for counterpart International Application No. PCT/US2013/071596 mailed Apr. 11, 2014.

* cited by examiner

*Primary Examiner* — Daquan Zhao
(74) *Attorney, Agent, or Firm* — Kenneth A. Haas

(57) ABSTRACT

A video tagging method, a video analytics method, and a Computer Assisted Dispatch (CAD) system use incident reports for video tagging and searching. A CAD system is integrated with field-based video surveillance systems to aid in searching video content and subsequent tagging of the video content. The systems and methods can include extracting keywords from a CAD incident report and creating a small, focused, and incident-specific dictionary on which to perform video searching in real-time. The small, focused, and incident-specific dictionary increases tagging accuracy and reduces tagging processing time in the context of video analytics. Further, a multi-pass approach in real-time continually updates and disseminates to video cameras of interest the small, focused, and incident-specific dictionary as the CAD incident report is updated and as the incident of interest plays out.

17 Claims, 7 Drawing Sheets

_US 8,837,906 B2_

COMPUTER ASSISTED DISPATCH INCIDENT REPORT VIDEO SEARCH AND TAGGING SYSTEMS AND METHODS

FIELD OF THE DISCLOSURE

The present disclosure relates generally to video tagging and analytics and more particularly to systems and methods for using Computer Assisted Dispatch (CAD) incident reports for video tagging, searching, analytics, etc.

BACKGROUND

Video surveillance systems and methods are being deployed and networked throughout various geographical regions. For example, mobile digital video recorder (MDVR) in the public safety context (e.g., police, fire, medical, etc.) can be located on a vehicle dashboard, on public safety personnel or the like, fixed on a pole for example, and the like. As can be expected with the proliferation of video surveillance systems and methods, significant amounts of video are being recorded and captured making it increasing important to index recorded video to make it searchable by features. Further, it would be helpful to pre-filter the video prior to upload and/or saving/storing. In a MDVR used in a public safety role, there is often an incident report that is in effect for periods of time during which video is being captured. Computer Assisted Dispatch (CAD) (also referred to as Computer Aided Dispatch) systems and methods can be used to generate the incident reports. Typically a dispatcher announces relevant call details to the field personnel who take action accordingly. Conventionally, there is no real-time integration of CAD incident reports and field-captured video.

Video analytics generally refers to processing and searching video such as to detect something contained therein on one or more frames of captured video. Conventionally, video analytics is difficult due to all of the possible permutations of objects, people, etc. that could be contained in each video frame. Specifically, all items that can be in video frames in the context of video analytics can be contained in a so-called dictionary. That said, processing is complex and time-consuming with conventional dictionaries being extremely large.

Accordingly, with the vast proliferation of video captured in the field, there is a need for video tagging and searching systems and methods to assist in retrieval, storage, and/or analytics.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
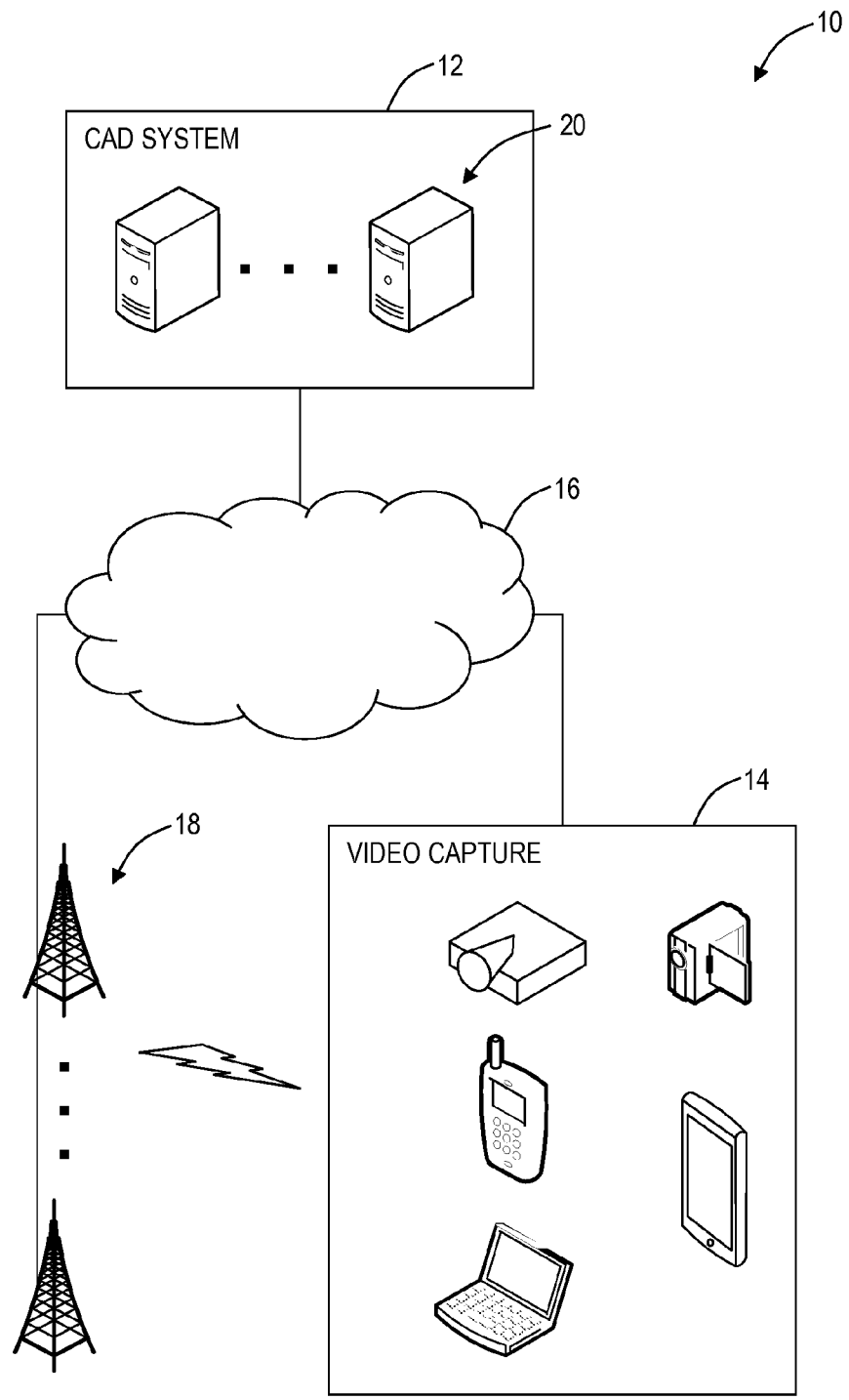
FIG. 1 is a network diagram of a video tagging system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various exemplary embodiments, systems and methods are described using Computer Assisted Dispatch (CAD) incident reports or the like for video tagging, searching, analytics, etc. In an exemplary embodiment, the systems and methods integrate CAD with video surveillance systems to aid in searching video content and subsequent tagging of the video content for video analytics. For example, the systems and methods can include extracting keywords from a CAD incident report and creating a small, focused, and incident-specific dictionary on which to perform video searching in real-time or later. Advantageously, the small, focused, and incident-specific dictionary increases tagging accuracy and reduces tagging processing time with respect to video analytics. Further, the systems and methods can include a multi-pass approach in real-time that continually updates the small, focused, and incident-specific dictionary as the CAD incident report is updated and as the incident of interest plays out. This can be used for real-time, near real-time, or later processing of captured video. The CAD system cam be communicatively coupled to a video surveillance system for dissemination of the small, focused, and incident-specific dictionary based on individual camera's relevance to the incident of interest.

As described herein, tagging generally refers to associating keywords such as in an incident-specific dictionary or the like with video metadata. With this tagging, searching can include algorithmic searching of captured video utilizing the incident-specific dictionary such as finding anything in the captured video related to the incident-specific dictionary or searching the captured video based on search terms. In an exemplary aspect, the systems and methods greatly improve video analytics by significantly reducing the associated dictionary, i.e. the incident-specific dictionary, based on terms gathered from an incident report, i.e. a CAD incident report or the like. With a reduced dictionary that is relevant to an incident, video analytics can be a powerful tool.

In an exemplary embodiment, a video tagging method based on an incident report and an associated incident-specific dictionary includes capturing keywords from the incident report related to an incident of interest at a first time period; creating an incident-specific dictionary for the incident of interest based on the captured keywords; providing the incident-specific dictionary from the first time period to at least one video camera capturing video based on a plurality of factors or a back-end server communicatively coupled to the at least one video camera; and utilizing the keywords from the incident report by the at least one video camera to tag captured video.

In another exemplary embodiment, a video analytics method includes developing an incident-specific dictionary based on an incident report related to an incident of interest, wherein the incident-specific dictionary includes a focused list of objects and people based on the incident report; receiving the incident-specific dictionary at a first camera based on geographic proximity to the incident of interest; capturing video by the first camera; tagging the captured video by the first camera with keywords in the incident-specific dictionary; and analyzing the captured video using the keywords in the incident-specific dictionary to perform video analytics based on the focused list.

In yet another exemplary embodiment, a Computer Assisted Dispatch (CAD) system includes a network interface communicatively coupled to a network; a processor communicatively coupled to the network interface; memory including instructions that, when executed, cause the processor to: capture keywords from an incident report related to an incident of interest at a first time period; create an incident-specific dictionary for the incident of interest based on the captured keywords; provide, via the network interface, the incident-specific dictionary from the first time period to at least one video camera capturing video based on a plurality of factors; capture updated keywords as the incident of interest unfolds at a second time period; update the incident-specific dictionary with the updated keywords; and provide the updated incident-specific dictionary to another video camera or a back-end server communicatively coupled to the another video camera a based on the plurality of factors.

Referring to FIG. 1, in an exemplary embodiment, a network diagram illustrates a video tagging system 10. Specifically, the video tagging system 10 includes a CAD system 12, a video capture system 14, a network 16, and a wireless network 18. The CAD system 12 is communicatively coupled to the video capture system 14 via the network 16, the wireless network 18, and/or other components or networks not illustrated herein. The CAD system 12 is configured to generate CAD incident reports. As described herein, the CAD incident reports can include messages with information such as locations, people of interest, generalized subject description, event synopsis, responding units, or any other relevant information to the incident. The CAD incident reports can also be updated as associated incidents unfold. Specifically, the CAD system 12 can include dispatchers, i.e. CAD operators or dispatchers, communicatively coupled to servers 20 which ultimately connect to the video capture system 14 via the networks 16, 18.

The video capture system 14 includes a plurality of cameras and associated processing components for capturing real-time video over a geographic region. The cameras can include MVDRs. Also, the cameras can be located on first responders or in first responders' vehicles. Even further, the cameras can be surveillance cameras disposed about the geographic region such as on street lights, on sign posts, on and/or in buildings, etc. Each camera is configured to capture video and optionally audio and the processing components are configured to process the video as is described herein. Specifically, the processing components can include tagging video with keywords from an incident-specific dictionary from the CAD system 12 thereby associating the keywords with captured video metadata. Further, the processing components can be configured to search real-time or close to real-time captured video and/or audio looking for items in the incident-specific dictionary as well as notifying personnel once detection occurs.

The CAD system 12 can include a suite of software packages used to initiate public safety calls for service, dispatch, and maintain the status of responding resources in the field. The CAD system 12 can be generally used by emergency communications dispatchers, call-takers, and 911 operators in centralized, public-safety call centers, as well as by field personnel utilizing mobile data terminals (MDTs) or mobile data computers (MDCs). The CAD system 12 can include several functional software modules executed on servers 20 that provide services at multiple levels in a dispatch center and in the field of public safety. These functional modules can include call input, call dispatching, call status maintenance, event notes, field unit status and tracking, and call resolution and disposition. The CAD system 12 can also include interfaces that permit the software to provide services to dispatchers, call takers, and field personnel with respect to control and use of analog radio and telephony equipment, as well as logger-recorder functions.

The CAD incident reports are sent from the servers 20 to dispatchees in the field. For example, the dispatchees can include public safety personnel or the like. The dispatchees can have a mobile device that is used to display and/or play the CAD incident reports. The mobile device can also be used for a plurality of additional purposes, e.g. store and retrieve data, communicate on the networks 16, 18, etc. The mobile devices can include MDTs, MDCs, smart phones, tablets, two-way radios, etc. The CAD incident reports can also be updated by both the dispatcher and/or the dispatchees as the associated incident unfolds.

For example, an exemplary CAD incident report can be as follows:

| | |
|---|---|
| LOCATION: | 1234 Main St. |
| REPORTING PARTY: | John Doe, 555-5555, 4567 Main St. |
| TIMESTAMP: | 4:01:03 EDT, 8/24 |
| INCIDENT: | Armed Robbery (in progress) |
| SYNOPSIS: | "Caller reports Quick Mart convenience store being held up/Caller advises suspect is in a white 2 door sedan speeding away heading west." |

The aforementioned CAD incident report can be sent via the servers 20 to a plurality of dispatchees, such as police officers. Subsequently, police officers may be tagged to or included in the CAD incident report as follows:

| | |
|---|---|
| LOCATION: | 1234 Main St. |
| REPORTING PARTY: | John Doe, 555-5555, 4567 Main St. |
| TIMESTAMP: | 4:02:33 EDT, 8/24 |
| INCIDENT: | Armed Robbery (in progress) |
| SYNOPSIS: | "Caller reports Quick Mart convenience store being held up/Caller advises suspect is in a white 2 door sedan speeding away heading west." |
| UNITS: | 746 (On scene), 749 (in route) |

In the above, the CAD incident report has units, i.e. units 746, 749, tagged as responding units. These units could add additional details as the incident unfolds, such as:

| | |
|---|---|
| LOCATION: | 1234 Main St. |
| REPORTING PARTY: | John Doe, 555-5555, 4567 Main St. |
| TIMESTAMP: | 4:04:23 EDT, 8/24 |
| INCIDENT: | Armed Robbery (in progress) |
| SYNOPSIS: | "Caller reports Quick Mart convenience store being held up/Caller advises suspect is in a white 2 door sedan speeding away heading west/Unit 746 in pursuit of the white 2 door sedan heading north on South Blvd/Suspect driver is wearing a red jacket and glasses." |
| UNITS: | 746 (in pursuit), 749 (in route) |

As can be seen in the aforementioned unfolding CAD incident report, there is geographical data (e.g., 1234 Main St., speeding away heading west, heading north on South Blvd), timestamp information, and meaningful keywords (e.g., white 2 door sedan, red jacket, glasses, etc.).

In various exemplary embodiments, the CAD system 12 is configured to extract keywords from the CAD incident report, creating a small, focused, incident-specific dictionary on which to perform video search and to tag capture video. For example, in the aforementioned unfolding CAD incident report, the incident-specific dictionary may include white 2 door sedan, red jacket, glasses as well as various geographic descriptions, i.e. 1234 Main St., speeding away heading west, heading north on South Blvd. Note it is expected that the incident-specific dictionary will differ for each incident. A reduced incident-specific dictionary increases tagging accuracy and reduces tagging processing time. Further, the reduced incident-specific dictionary streamlines and optimizes video analytics. Also, the incident-specific dictionary is continually evolving as the incident of interest plays out, i.e. a multi-pass approach as CAD incident report is updated.

Further, the incident specific dictionary is disseminated to various components in the video capture system 14 based on the components relevance to the incident. For example, the dictionary could be provided to a camera associated with the responding officers or officers in proximity and any cameras that are in the geographic vicinity, e.g. street light cameras, surveillance cameras, etc. Additionally, the dictionary could be provided to cameras and the like in the video capture system 14 based on other metrics such as cameras farther away from the incident of interest but along probable routes for fleeing suspect, all cameras in a certain geographic region, etc. For example, the dictionary could be provided to various cameras in a geographic region with an ever expanding radius based on time, probable speed of a suspect or vehicle, etc. The video tagging system 10 can use algorithms to ensure the dictionary is provided to any relevant video capture system 14 to the incident.

Taking the aforementioned unfolding CAD incident report as an example, at a first point, timestamp 4:01:03 EDT, 8/24, the dictionary would include Quick Mart convenience, white 2 door sedan, etc., and this dictionary would be provided to cameras in the vicinity of the location, 1234 Main St. At a second point, timestamp 4:02:33 EDT, 8/24, the dictionary stays the same, but additional cameras may receive the updated dictionary, i.e. cameras associated with units 746 and 749. At a third point, timestamp 4:04:23 EDT, 8/24, the dictionary can be updated, at that point forward, to include Suspect driver is wearing a red jacket and glasses, etc. and the dictionary can be further provided to additional cameras, i.e. cameras in a northward direction on South Blvd. Thus, the video tagging system 10 includes an evolving, dynamically updated incident-specific dictionary managed by the CAD system 12 that is provided over time to geographically relevant cameras in the video capture system 14. Further, the dynamically updated incident-specific dictionary can also be applied to older video to improve analytics thereon. That is, previously captured video from geographically relevant cameras can be provided the updated incident-specific dictionary for tagging thereon.

Figure 2:
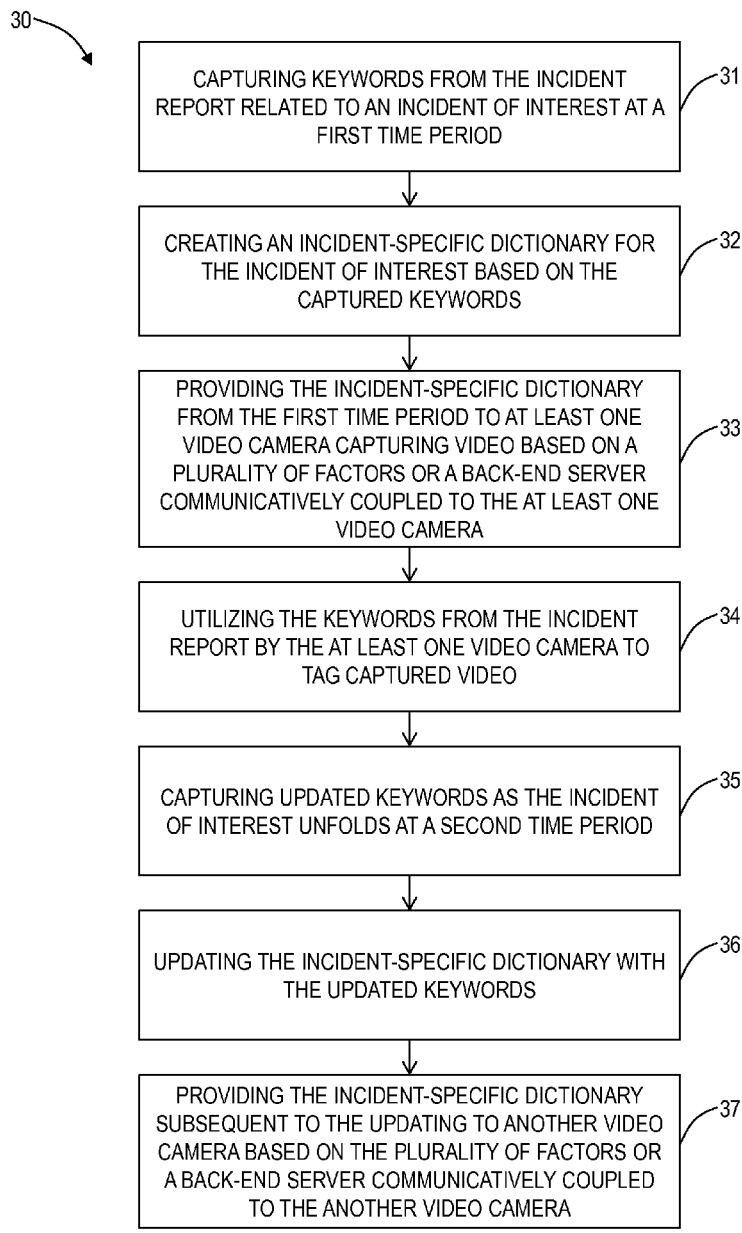
FIG. 2 is a flowchart of a video tagging method based on an incident report and an associated incident-specific dictionary in accordance with some embodiments.

The video capture system 14 can use the incident-specific dictionary for efficient video segment search, identification, video analytics, prioritization and targeted video segment sharing. Specifically, cameras and associated processing devices in the video capture system 14 can use the incident-specific dictionary for tagging captured video which increases tagging accuracy and reduces tagging processing time in the context of video analytics. Overall, this provides efficiency, speed, and optimization in the video capture system 14, prioritizing video segments and allowing video to be culled, reducing storage requirements in mobile units for the video capture system 14. It is expected this intelligence in the video capture system 14 will make it more operator friendly, tightly coupling video content to incident reports and making video more searchable after uploading with the tags from the dictionary. Thus, the system 10 combines video tagging with a restricted dictionary of keywords derived from real-time dynamically updated CAD incident report, allowing for efficient video segment search, identification, video analytics, prioritization and targeted video segment sharing Referring to FIG. 2, in an exemplary embodiment, a flowchart illustrates a video tagging method 30 based on an incident report and an associated incident-specific dictionary. In an exemplary embodiment, the video tagging method 30 can be implemented by the video tagging system 10. The video tagging method 30 includes capturing keywords from the incident report related to an incident of interest at a first time period (step 31). The video tagging method 30 further includes creating an incident-specific dictionary for the incident of interest based on the captured keywords (step 32). The video tagging method 30 further includes providing the incident-specific dictionary from the first time period to at least one video camera capturing video based on a plurality of factors or a back-end server communicatively coupled to the at least one video camera (step 33). The plurality of factors determines which cameras receive the incident-specific dictionary. For example, the keywords can be categorized as location-related keywords and incident-related keywords. The plurality of factors can include direct responders of the incident of interest, nearby responders of the incident of interest, location based on the location-related keywords, and probable routes based on the location-related keywords. The video tagging method 30 can provide the incident-specific dictionary to the camera and/or the back-end server associated with the camera.

The video tagging method 30 further includes utilizing the keywords from the incident report by the at least one video camera to tag captured video (step 34). The video tagging method 30 can further include capturing updated keywords as the incident of interest unfolds at a second time period (step 35). The video tagging method 30 can further include updating the incident-specific dictionary with the updated keywords (step 36). The video tagging method 30 can further include providing the incident-specific dictionary subsequent to the updating to another video camera based on the plurality of factors or a back-end server communicatively coupled to the another video camera (step 37). In an exemplary embodiment, the keywords are captured by the CAD system 12, the incident-specific dictionary is created for the incident of interest by the CAD system 12, and the CAD system 12 is configured to disseminate the incident-specific dictionary and associated updates to the at least one video camera in the video capture system 14 based on the plurality of factors.

Figure 3:
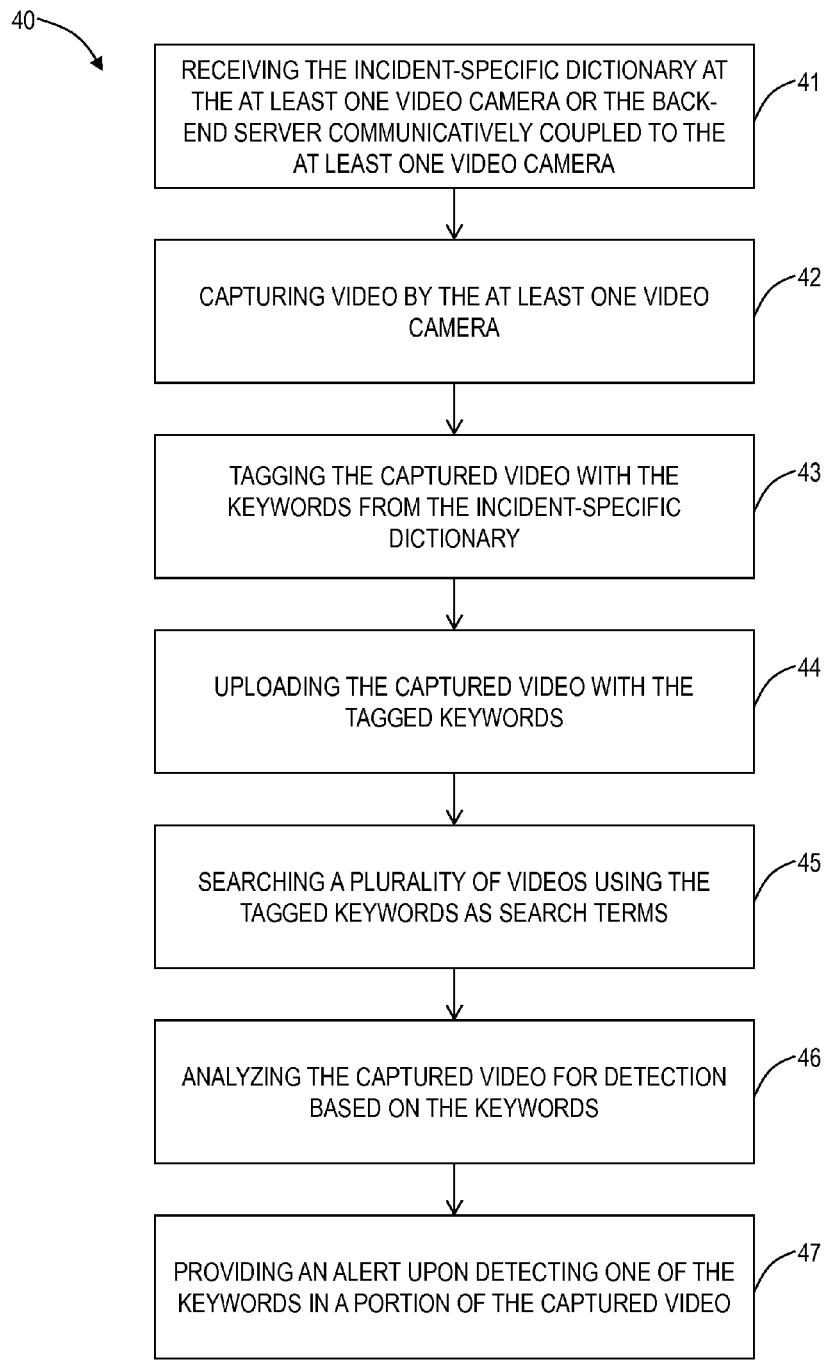
FIG. 3 is a flowchart of a video tagging method for capturing video using the incident-specific dictionary in accordance with some embodiments.

Referring to FIG. 3, in an exemplary embodiment, a flowchart illustrates a video tagging method 40 for capturing video using the incident-specific dictionary. The video tagging method 40 can be used with the video tagging method 30 and/or the video tagging system 10. The video tagging method 40 includes receiving the incident-specific dictionary at the at least one video camera or the back-end server communicatively coupled to the at least one video camera (step 41). The video tagging method 40 further includes capturing video by the at least one video camera (step 42). The video tagging method 40 further includes tagging the captured video with the keywords from the incident-specific dictionary (step 43). The video tagging method 40 further includes uploading the captured video with the tagged keywords (step 44). The video tagging method 40 can further include searching a plurality of videos using the tagged keywords as search terms (step 45). The video tagging method 40 can further include analyzing the captured video for detection based on the keywords (step 46). The video tagging method 40 can further include providing an alert upon detecting one of the keywords in a portion of the captured video (step 47). In an exemplary embodiment, the at least one video camera includes a mobile digital video recorder (MDVR). In another exemplary embodiment, the at least one video camera includes a surveillance camera and one of the plurality of factors includes proximity to the incident of interest.

Figure 4:
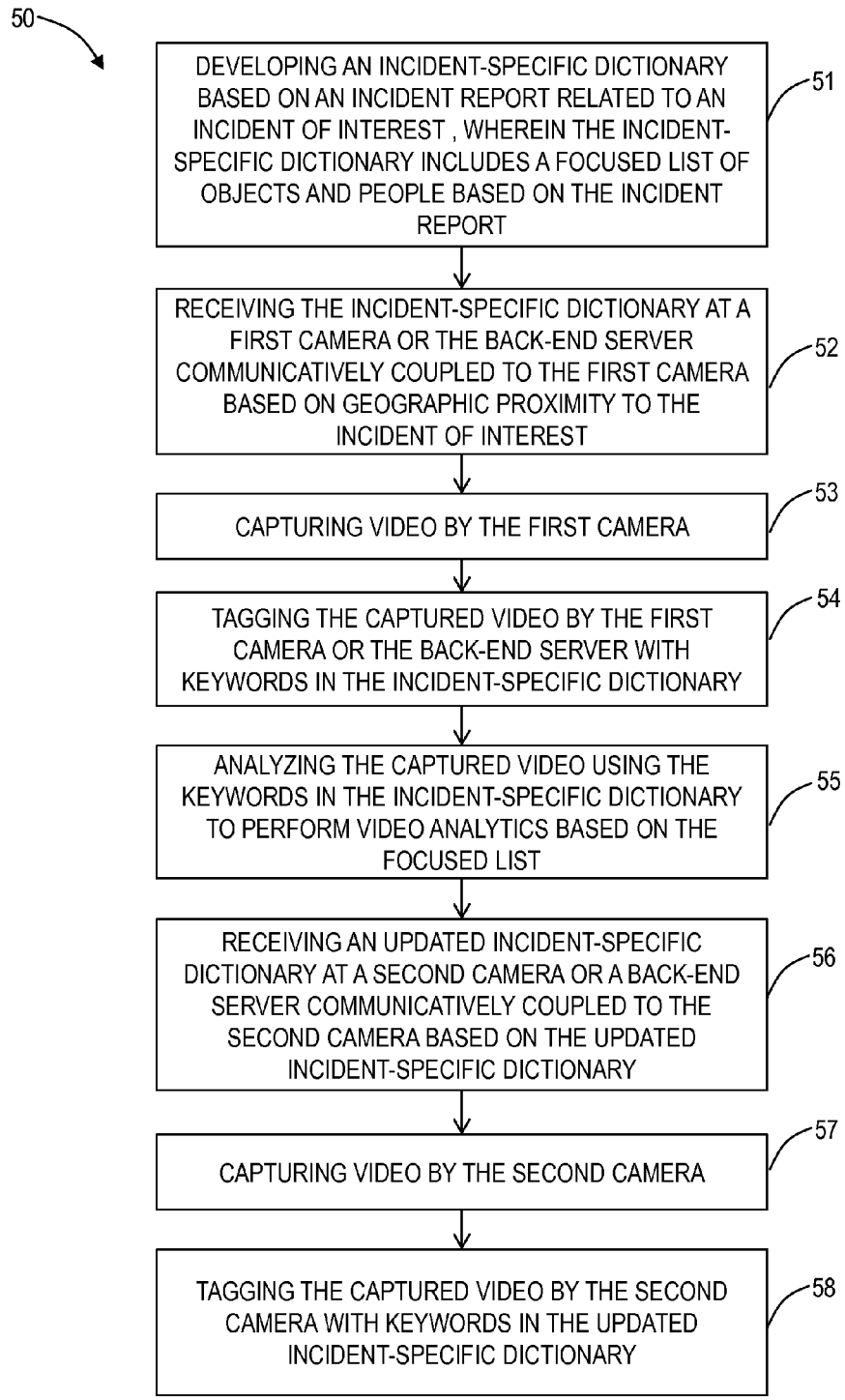
FIG. 4 is a flowchart of a video analytics method tagging video based on an incident report and an associated incident-specific dictionary in accordance with some embodiments.

Referring to FIG. 4, in an exemplary embodiment, a flowchart illustrates a video analytics method 50 tagging video based on an incident report and an associated incident-specific dictionary. The video analytics method 50 can be used with the video tagging system 10 and/or the video tagging methods 30, 40. The video analytics method 50 includes developing an incident-specific dictionary based on an incident report related to an incident of interest (step 51). The incident-specific dictionary includes a focused list of objects and people based on the incident report. That is, an objective of the video analytics method 50 is to provide a reduced-sized dictionary for real-time or later searching of video. Because the incident-specific dictionary is a reduced-size dictionary, video analytics are improved and more efficient. That is, the video analytics know what to look for based on the incident report, e.g. a CAD report. This streamlines the video analytics significantly versus a conventional dictionary that can include several orders of magnitude more terms.

The video analytics method 50 includes receiving the incident-specific dictionary at a first camera or the back-end server communicatively coupled to the first camera based on geographic proximity to the incident of interest (step 52). That is, the video analytics method 50 can push the incident-specific dictionary to relevant cameras such that the incident-specific dictionary can be tagged with metadata of the video for real-time or later processing. The video analytics method 50 includes capturing video by the first camera (step 53). The video analytics method 50 further includes tagging the captured video by the first camera or the back-end server with keywords in the incident-specific dictionary (step 54). As described above, here, the captured video can include associated metadata with the incident-specific dictionary.

The video analytics method 50 includes analyzing the captured video using the keywords in the incident-specific dictionary to perform video analytics based on the focused list (step 55). Here, the video analytics method 50 performs video analytics with the reduced-size dictionary. This analyzing step can be performed by the first camera in real-time or near real-time as well as a server. The analyzing can include searching the captured video for terms in the incident-specific dictionary. This searching can be either algorithmic (e.g., find anything related to the incident-specific dictionary in the captured video) or based on search terms (e.g., find a specific term). For example, assume the incident-specific dictionary includes a term for a "red car." This significantly improves the video analytic functionality as the analyzing knows to look at the captured video for a red car as opposed to looking for all cars, trucks, people, etc.

The video analytics method 50 can include receiving an updated incident-specific dictionary at a second camera or a back-end server communicatively coupled to the second camera based on the updated incident-specific dictionary (step 56). Here, the video analytics method 50 can expand to other cameras as the incident unfolds. The video analytics method 50 can include capturing video by the second camera (step 57). The video analytics method 50 can include tagging the captured video by the second camera with keywords in the updated incident-specific dictionary (step 58). Similar video analytics can be performed for the captured video by the second camera as described herein with respect to the first camera.

Figure 5:
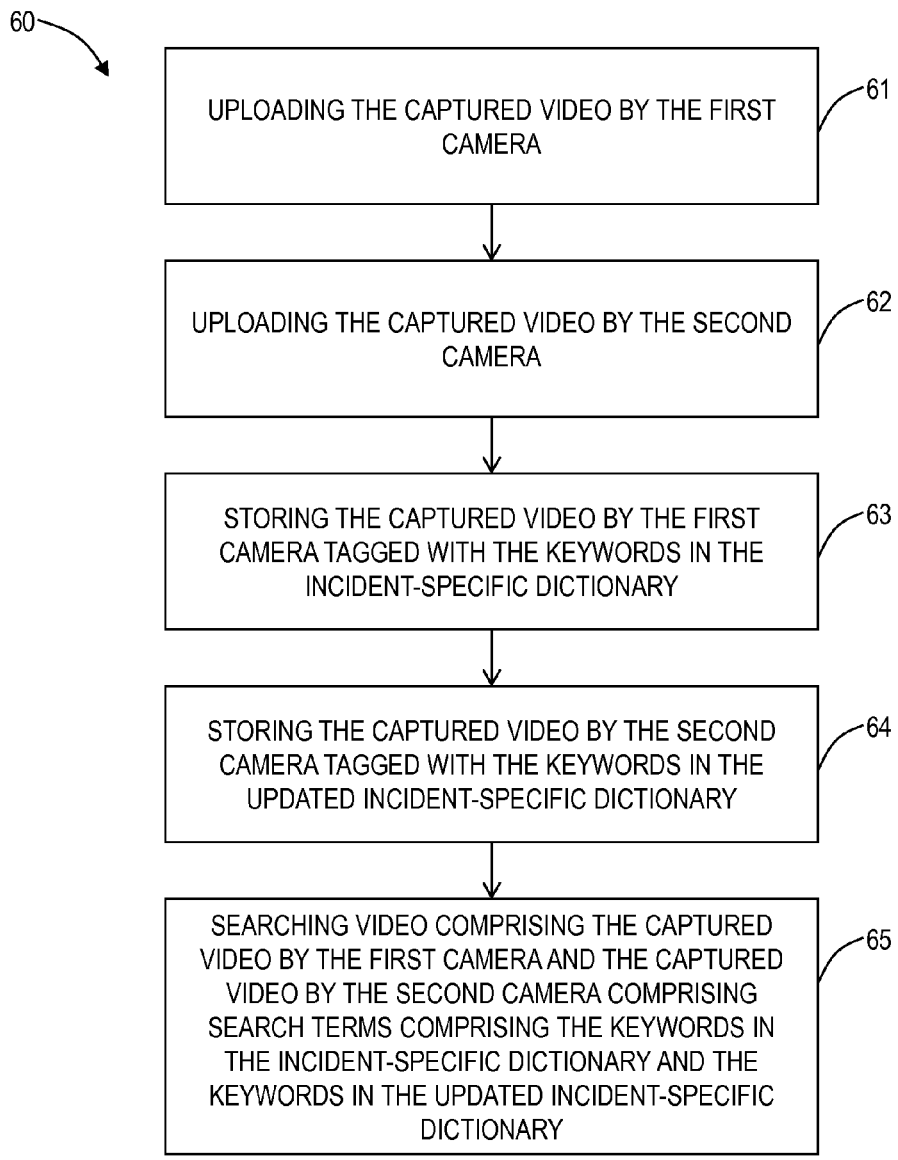
FIG. 5 is a flowchart of a video analytics method for storing and searching video based on the incident report and the associated incident-specific dictionary in accordance with some embodiments.

Referring to FIG. 5, in an exemplary embodiment, a flowchart illustrates a video capture method 60 for storing and searching video based on the incident report and the associated incident-specific dictionary. The video capture method 60 can be used with the video tagging system 10, the video capture method 50, and/or the video tagging methods 30, 40. The video capture method 60 includes uploading the captured video by the first camera (step 61). The video capture method 60 further includes uploading the captured video by the second camera (step 62). The video capture method 60 further includes storing the captured video by the first camera tagged with the keywords in the incident-specific dictionary (step 63). The video capture method 60 further includes storing the captured video by the second camera tagged with the keywords in the updated incident-specific dictionary (step 64). The video capture method 60 can further include searching video including the captured video by the first camera and the captured video by the second camera including search terms comprising the keywords in the incident-specific dictionary and the keywords in the updated incident-specific dictionary (step 65). In an exemplary embodiment, the first camera includes a surveillance camera in proximity to the incident of interest based on the incident-specific dictionary and the second camera includes a mobile video data recorder associated with a responder based on the updated incident-specific dictionary.

Figure 6:
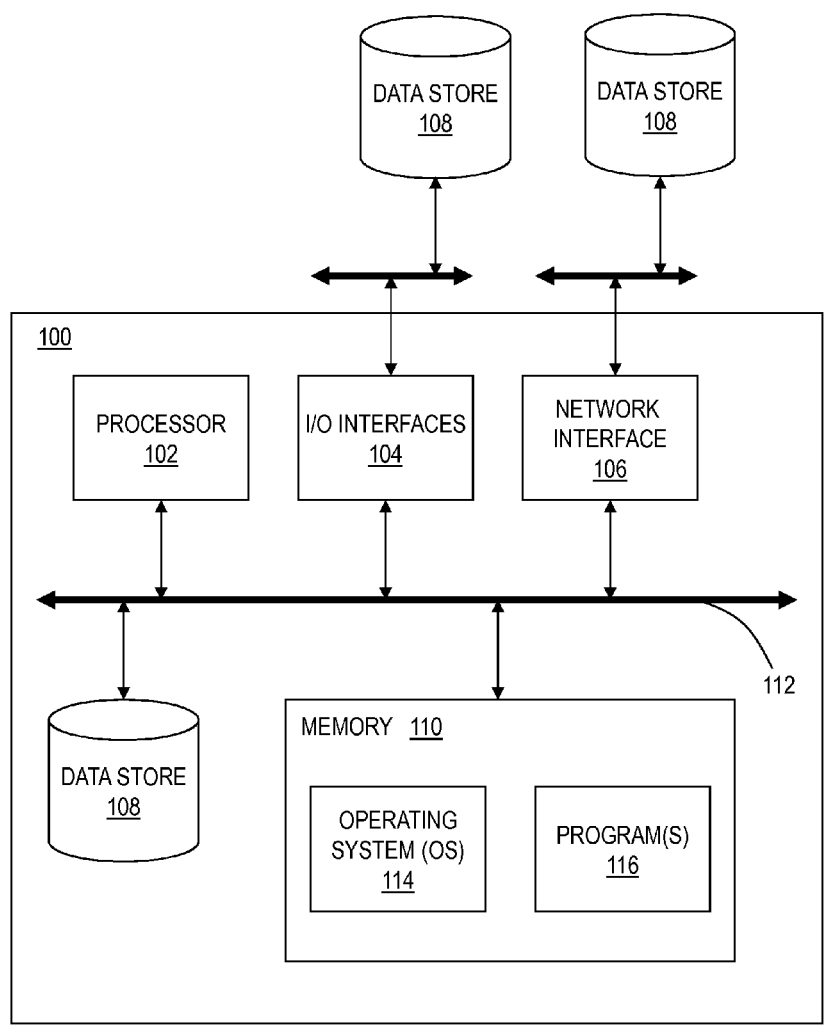
FIG. 6 is a block diagram illustrates an exemplary implementation of a server for the CAD system in accordance with some embodiments.

Referring to FIG. 6, in an exemplary embodiment, a block diagram illustrates an exemplary implementation of a server 100 for the CAD system 12. The server 100 can be a digital computer that, in terms of hardware architecture, generally includes a processor 102, input/output (I/O) interfaces 104, a network interface 106, a data store 108, and memory 110. It should be appreciated by those of ordinary skill in the art that FIG. 6 depicts the server 100 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 can be, for example but not limited to, one or more buses or other wired or wireless connections, as is known in the art. The local interface 112 can have additional elements, which are omitted for simplicity, such as controllers, buffers (caches), drivers, repeaters, and receivers, among many others, to enable communications. Further, the local interface 112 can include address, control, and/or data connections to enable appropriate communications among the aforementioned components.

The processor 102 is a hardware device for executing software instructions. The processor 102 can be any custom made or commercially available processor, a central processing unit (CPU), an auxiliary processor among several processors associated with the server 100, a semiconductor-based microprocessor (in the form of a microchip or chip set), or generally any device for executing software instructions. When the server 100 is in operation, the processor 102 is configured to execute software stored within the memory 110, to communicate data to and from the memory 110, and to generally control operations of the server 100 pursuant to the software instructions. The I/O interfaces 104 can be used to receive user input from and/or for providing system output to one or more devices or components. User input can be provided via, for example, a keyboard, touch pad, and/or a mouse. System output can be provided via a display device and a printer (not shown). I/O interfaces 104 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 106 can be used to enable the server 100 to communicate on a network, such as to communicate with the video capture system 14 over the networks 16, 18. The network interface 106 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 106 can include address, control, and/or data connections to enable appropriate communications on the network. A data store 108 can be used to store data such as captured video tagged with keywords from the incident-specific dictionary. The data store 108 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 can incorporate electronic, magnetic, optical, and/or other types of storage media. In one example, the data store 108 can be located internal to the server 100 such as, for example, an internal hard drive connected to the local interface 112 in the server 100. Additionally in another embodiment, the data store 108 can be located external to the server 100 such as, for example, an external hard drive connected to the I/O interfaces 104 (e.g., SCSI or USB connection). In a further embodiment, the data store 108 can be connected to the server 100 through a network, such as, for example, a network attached file server.

The memory 110 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 can incorporate electronic, magnetic, optical, and/or other types of storage media. Note that the memory 110 can have a distributed architecture, where various components are situated remotely from one another, but can be accessed by the processor 102. The software in memory 110 can include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein.

In an exemplary embodiment, the server 100 can be a CAD system, and the memory 110 can include instructions that, when executed, cause the processor to capture keywords from an incident report related to an incident of interest at a first time period, create an incident-specific dictionary for the incident of interest based on the captured keywords, provide, via the network interface 106, the incident-specific dictionary from the first time period to at least one video camera capturing video or a back-end server communicatively coupled to the at least one video camera based on a plurality of factors, capture updated keywords as the incident of interest unfolds at a second time period, update the incident-specific dictionary with the updated keywords, and provide the updated incident-specific dictionary to another video camera or a back-end server communicatively coupled to the another video camera based on the plurality of factors. The instructions that, when executed, further can cause the processor to receive an alert from one of a plurality of video cameras that a keyword from the incident-specific dictionary or the updated incident-specific dictionary has been detected in captured video. The instructions that, when executed, further can cause the processor to receive captured video from the at least one video camera with the captured video tagged with keywords from the incident-specific dictionary, and perform video analytics on the captured video using the incident-specific dictionary associated therewith.

Figure 7:
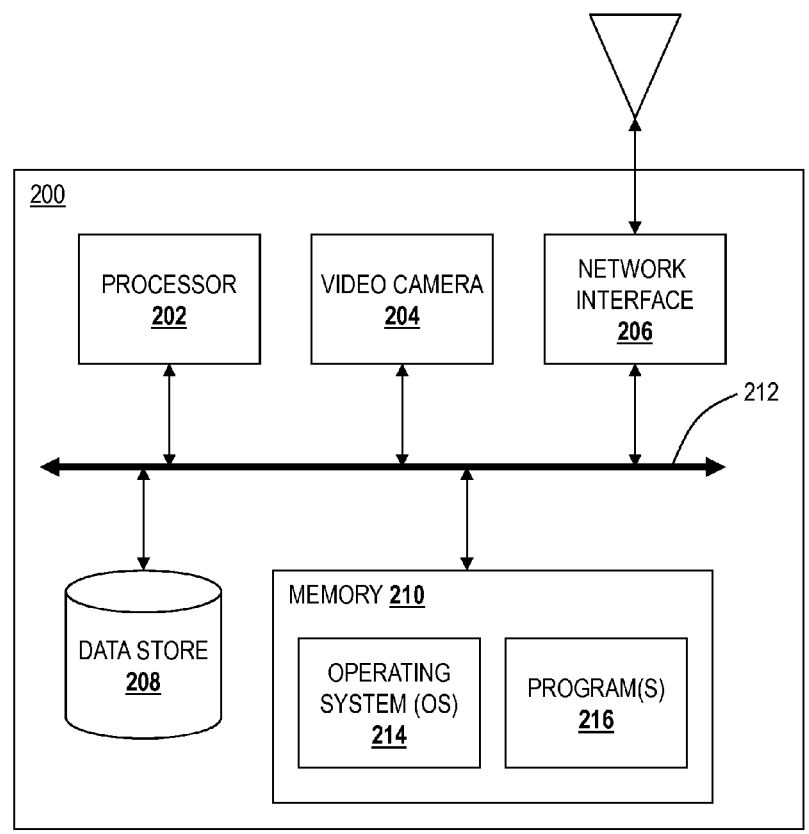
FIG. 7 is a block diagram of an exemplary implementation of a camera which is one component in the video capture system in accordance with some embodiments.

Referring to FIG. 7, in an exemplary embodiment, a block diagram of an exemplary implementation of a camera 200 which is one component in the video capture system 14. The camera 200 can be a digital device that, in terms of hardware architecture, generally includes a processor 202, a video camera 204, a network interface 206, a data store 208, and memory 210. It should be appreciated by those of ordinary skill in the art that FIG. 7 depicts the camera 200 in an oversimplified manner, and a practical embodiment can include additional components and suitably configured processing logic to support known or conventional operating features that are not described in detail herein. The components (202, 204, 206, 208, and 210) are communicatively coupled via a local interface 212. The local interface 212 can be, for example but not limited to, one or more buses or other wired or wireless connections, as is known in the art. The local interface 212 can have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 can be any custom made or commercially available processor, a central processing unit (CPU), an auxiliary processor among several processors associated with the camera 200, a semiconductor-based microprocessor (in the form of a microchip or chip set), or generally any device for executing software instructions. When the camera 200 is in operation, the processor 202 is configured to execute software stored within the memory 210, to communicate data to and from the memory 210, and to generally control operations of the camera 200 pursuant to the software instructions. In an exemplary embodiment, the processor 202 may include a mobile optimized processor such as optimized for power consumption and mobile applications. The video camera 204 is configured to capture video and/or audio. This can include multiple cameras. Further, the video camera 204 can be fixed or moveable (e.g., pan, tilt, zoom, etc.). The video camera 204 can capture video in a digital format according to various known techniques and stored the captured video in the data store 208 and/or upload the capture video via the network interface 206.

The network interface 206 can be used to enable the camera 200 to communicate on a network, such as to communicate with the CAD system 12 over the networks 16, 18. The network interface 206 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 206 can include address, control, and/or data connections to enable appropriate communications on the network. A data store 208 can be used to store data such as captured video tagged with keywords from the incident-specific dictionary. The data store 208 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 can incorporate electronic, magnetic, optical, and/or other types of storage media.

The memory 210 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 210 may incorporate electronic, magnetic, optical, and/or other types of storage media. Note that the memory 210 can have a distributed architecture, where various components are situated remotely from one another, but can be accessed by the processor 202. The software in memory 210 can include one or more software programs, each of which includes an ordered listing of executable instructions for implementing logical functions. In the example of FIG. 7, the software in the memory 210 includes a suitable operating system (O/S) 214 and programs 214. The operating system 214 essentially controls the execution of other computer programs, and provides scheduling, input-output control, file and data management, memory management, and communication control and related services. The programs 214 can include various applications, add-ons, etc. configured to provide end user functionality with the camera 200.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A video tagging method based on an incident report and an associated incident-specific dictionary, comprising:
   capturing keywords from the incident report related to an incident of interest at a first time period;
   creating an incident-specific dictionary for the incident of interest based on the captured keywords;

capturing updated keywords at a second time period as the incident of interest unfolds;

updating the incident-specific dictionary with the updated keywords;

providing the updated incident-specific dictionary to at least one video camera capturing video based on a plurality of factors or providing the updated incident-specific dictionary to a back-end server communicatively coupled to the at least one video camera; and utilizing the keywords and updated keywords from the incident report by the at least one video camera to tag captured video.

2. The video tagging method of claim 1, further comprising:

providing the incident-specific dictionary subsequent to the updating to another video camera based on the plurality of factors or a back-end server communicatively coupled to the another video camera.

3. The video tagging method of claim 1, wherein the keywords are categorized as location-related keywords and incident-related keywords.

4. The video tagging method of claim 3, wherein the plurality of factors comprise any of direct responders of the incident of interest, nearby responders of the incident of interest, location based on the location-related keywords, and probable routes based on the location-related keywords.

5. The video tagging method of claim 1, wherein the keywords are captured by a Computer Assisted Dispatch (CAD) system, wherein the incident-specific dictionary is created for the incident of interest by the CAD system, and wherein the CAD system is configured to disseminate the incident-specific dictionary and associated updates to the at least one video camera based on the plurality of factors.

6. The video tagging method of claim 5, further comprising:

receiving the incident-specific dictionary at the at least one video camera or the back-end server communicatively coupled to the at least one video camera;

capturing video by the at least one video camera;

tagging the captured video with the keywords from the incident-specific dictionary; and uploading the captured video with the tagged keywords.

7. The video tagging method of claim 6, further comprising:

searching a plurality of videos using the tagged keywords as search terms.

8. The video tagging method of claim 6, further comprising:

analyzing the captured video for detection based on the keywords; and providing an alert upon detecting one of the keywords in a portion of the captured video.

9. The video tagging method of claim 1, wherein the at least one video camera comprises a mobile digital video recorder.

10. The video tagging method of claim 1, wherein the at least one video camera comprises a surveillance camera and one of the plurality of factors comprises proximity to the incident of interest.

11. A video analytics method, comprising:

developing an incident-specific dictionary based on an incident report related to an incident of interest, wherein the incident-specific dictionary comprises a focused list of objects and people based on the incident report;

receiving the incident-specific dictionary at a first camera or the back-end server communicatively coupled to the first camera based on geographic proximity to the incident of interest;

capturing video by the first camera;

tagging the captured video by the first camera or the back-end server with keywords in the incident-specific dictionary; and analyzing the captured video using the keywords in the incident-specific dictionary to perform video analytics based on the focused list;

receiving an updated incident-specific dictionary at a second camera or a back-end server communicatively coupled to the second camera based on the updated incident-specific dictionary;

capturing video by the second camera; and tagging the captured video by the second camera with keywords in the updated incident-specific dictionary.

12. The video analytics method of claim 11, further comprising:

uploading the captured video by the first camera;

uploading the captured video by the second camera;

storing the captured video by the first camera tagged with the keywords in the incident-specific dictionary; and storing the captured video by the second camera tagged with the keywords in the updated incident-specific dictionary.

13. The video analytics method of claim 12, further comprising:

searching video comprising the captured video by the first camera and the captured video by the second camera comprising search terms comprising the keywords in the incident-specific dictionary and the keywords in the updated incident-specific dictionary.

14. A Computer Assisted Dispatch (CAD) system, comprising:

a network interface communicatively coupled to a network;

a processor communicatively coupled to the network interface;

memory comprising instructions that, when executed, cause the processor to:

capture keywords from an incident report related to an incident of interest at a first time period;

create an incident-specific dictionary for the incident of interest based on the captured keywords;

provide, via the network interface, the incident-specific dictionary from the first time period to at least one video camera capturing video or to a back-end server communicatively coupled to the at least one video camera based on a plurality of factors;

capture updated keywords as the incident of interest unfolds at a second time period;

update the incident-specific dictionary with the updated keywords; and provide the updated incident-specific dictionary to another video camera or to a back-end server communicatively coupled to the another video camera based on the plurality of factors.

15. The CAD system of claim 14, wherein the plurality of factors comprise any of direct responders of the incident of interest, nearby responders of the incident of interest, location based on the location-related keywords, and probable routes based on the location-related keywords.

16. The CAD system of claim 14, wherein the instructions that, when executed, further cause the processor to:
  receive an alert from one of a plurality of video cameras or associated back-end server that a keyword from the incident-specific dictionary or the updated incident-specific dictionary has been detected in captured video, wherein the alert is generated based on video analytics using the incident-specific dictionary.

17. The CAD system of claim 14, wherein the instructions that, when executed, further cause the processor to: receive captured video from the at least one video camera or associated back-end server with the captured video tagged with keywords from the incident-specific dictionary; and perform video analytics on the captured video using the incident-specific dictionary associated therewith.

* * * * *

UNITED STATES PATENT AND TRADEMARK OFFICE
CERTIFICATE OF CORRECTION

| | | |
|---|---|---|
| PATENT NO. | : 8,837,906 B2 | Page 1 of 1 |
| APPLICATION NO. | : 13/714663 | |
| DATED | : September 16, 2014 | |
| INVENTOR(S) | : Philip E. May et al. | |

It is certified that error appears in the above-identified patent and that said Letters Patent is hereby corrected as shown below:

IN THE SPECIFICATION:

In Column 2, Line 41, delete "cam" and insert -- can --, therefor.

In Column 3, Line 1, delete "MVDRs." and insert -- MDVRs. --, therefor.

Signed and Sealed this
Tenth Day of May, 2016

Michelle K. Lee
*Director of the United States Patent and Trademark Office*